United States Patent [19]

Stahovic

[11] 4,207,773
[45] Jun. 17, 1980

[54] MAGNETIC PISTON MACHINE

[76] Inventor: Robert F. Stahovic, 115 Church Rd., Lot 100, Butler, Pa. 16001

[21] Appl. No.: 961,286

[22] Filed: Nov. 16, 1978

Related U.S. Application Data

[63] Continuation of Ser. No. 738,655, Nov. 4, 1976, abandoned.

[51] Int. Cl.² .................. F16H 21/16; H02K 7/06
[52] U.S. Cl. .................................. 74/25; 310/80; 310/103
[58] Field of Search ............. 46/235, 236, 238, 239; 74/25; 310/80, 103; 417/415

[56] References Cited

U.S. PATENT DOCUMENTS

| Re. 29,165 | 3/1977 | Bode | 310/103 |
|---|---|---|---|
| 2,747,944 | 5/1965 | Baermann | 308/10 |
| 2,790,095 | 4/1957 | Peek et al. | 310/103 |
| 3,312,887 | 4/1967 | Reese et al. | 310/103 |
| 3,441,331 | 4/1969 | Kesling | 308/10 |
| 3,740,597 | 6/1973 | Mulasmajic | 310/80 |
| 3,801,095 | 4/1974 | Woron | 46/236 |
| 3,967,146 | 6/1976 | Howard | 310/80 |
| 3,992,132 | 11/1976 | Putt | 310/103 |
| 4,011,477 | 3/1977 | Scholin | 310/80 |

FOREIGN PATENT DOCUMENTS

| 2435316 | 2/1976 | Fed. Rep. of Germany | 74/25 |
|---|---|---|---|
| 2461171 | 6/1976 | Fed. Rep. of Germany | 308/10 |

Primary Examiner—Lawrence J. Staab
Attorney, Agent, or Firm—Robert D. Yeager

[57] ABSTRACT

Apparatus for converting rotary motion into reciprocating linear motion utilizing a plurality of magnetic segments secured to a rotary member; a pair of magnets affixed to a reciprocating member to be acted upon as the rotary member moves and a pair of fixed magnetic members, disposed outside of the magnets attached to the reciprocating member to control the length of stroke and return speed of the reciprocating member. The plurality of magnetic segments are supported from the rotatable member for rotation therewith. The elongated member has the linear movable magnets secured thereto. As the rotatable member revolves, the magnetic segments either repel or attract the magnets attached to the linear movable member causing reciprocating linear motion. Aligned with, but mounted outside of the linear movable magnets, are a pair of magnetic stop members. These stop or push block magnets limit linear movement of the elongated member and provide a return force on the linear movable magnets.

10 Claims, 7 Drawing Figures

MAGNETIC PISTON MACHINE

This is a continuation, of application Ser. No. 738,655, filed Nov. 4, 1976, now abandoned.

BACKGROUND OF THE INVENTION

1. Field of the Invention

This invention relates to a device for converting rotary motion to linear motion and more particularly to a rotary motion to linear motion converter utilizing magnetic members for determining the strength, speed and stroke of a reciprocating linear movable member.

2. Description of the Prior Art

Numerous prior art devices have been disclosed which utilize permanent magnets for converting motion of one type to motion of another type. Exemplary of these motion converting devices are prior art U.S. Pat. Nos. 1,947,920; 2,790,095; 3,773,439; 3,811,058; 3,899,703; 3,831,537; 3,703,653 and 3,609,425.

U.S. Pat. No. 1,947,920 to T. L. Primrose, which issued Feb. 20, 1934 shows a displayed device which converts rotary motion to linear motion, through the use of permanent magnets. An item to be moved, in a linear up-down direction, is confined by a guideway, and has a permanent magnet attached thereto. Four magnets having like poles facing outward are supported on a disc which can be rotated. The magnets attached to the disc are disposed to repel the magnet attached to the linear movable item. The device is constructed so that when the disc is rotated, the four magnetic members are sequentially brought into proximity to the linear movable member. The guided member is raised due to the repelling action of the magnets and falls due to the force of gravity.

U.S. Pat. No. 2,790,095 to J. J. Peek et al. which issued Apr. 23, 1957, discloses a device for converting rotary motion into reciprocating motion or conversely, and utilizes permanent magnets with spring members. A rotatable disc, restrained against reciprocating motion, has a plurality of magnets attached thereto. Another disc of similar construction but secured to permit reciprocating motion and being restrained against rotary motion is disposed in juxtaposition thereto. As the rotating disc moves, an alternating magnetic field is produced. Due to the rotation of the rotary member, the member, restrained against rotary movement only, will reciprocate. In a different embodiment, another rotary disc having magnets disposed thereon, is positioned on the opposite side of the reciprocating disc so when the discs are rotated, as the reciprocating disc is repelled by one set of rotating discs at the same time it is attracted by the other. Peek et al. shows use of a stationary cylindrical magnetic circuit for inhibiting rotary motion of the reciprocating member. In one embodiment, disclosed in Peek et al., the device utilizes an electromagnet in conjunction with a permanent magnet apparatus to produce simultaneous rotary and reciprocating motion in the same shaft.

U.S. Pat. No. 3,773,439 to F. R. Sheridan, which issued Nov. 29, 1973, teaches a reciprocating drive utilizing magnetic force for moving axially aligned magnetic members in a longitudinal direction. One magnet is driven by an electric motor, and a flywheel is provided connected to the other magnetic member. The flywheel in conjunction with the drive magnet moves the driven magnet as the drive magnet reciprocates. In a second embodiment, a spring, rather than a flywheel, is taught for returning the drive member to its original position.

U.S. Pat. No. 3,811,058 to Z. Z. Kiniski which issued May 14, 1974 disclosed apparatus which converts rotary motion into reciprocating motion by using permanent magnets. The apparatus disclosed is an engine block apparatus with magnetic pistons connected to a crank shaft for reciprocating motion. A rotating member, having magnets disposed thereon, is positioned beneath the piston to drive the piston upward as the rotating magnet comes into proximity to the magnetic piston. A return spring and gravity move the piston to the down position when the magnet on the reciprocating member is not repelling it upward. The piston is thus reciprocated up and down, turning a crankshaft output.

U.S. Pat. No. 3,899,703 to R. W. Kinnison, which issued Aug. 12, 1975, discloses a device using magnets to provide rotary motion. A permanent magnet is attached to a rotatable shaft. Two stationary permanent magnets are provided in a position to influence movement of the rotatable permanent magnet. Magnetic shunts are positioned between the stationary permanent magnets and the movable permanent magnets. The magnetic shunts are movable to alternately shunt out the magnetic force from one of the permanent magnets so that the rotatable permanent magnets rotate an output shaft.

U.S. Pat. No. 3,831,537 to S. Siegel, which issued Aug. 27, 1974, teaches apparatus for converting rotary motion into linear motion through the use of a rotating permanent magnet. A ferromagnetic piece is attached to a linear movable member and a return spring is provided for return motion of the linear movable member. As a magnetic member is rotated, the linear member is attracted and reciprocates up and down. U.S. Pat. No. 3,703,653, issued Nov. 21, 1972 to Tracey et al., teaches a permanent magnet reciprocating motor. The motor utilizes steel shunts which are inserted and withdrawn between the permanent magnets causing the motor to reciprocate. This patent also teaches a rotating motor utilizing a similar principle.

U.S. Pat. No. 3,609,425 issued Apr. 7, 1970 to F. R. Sheridan teaches a reciprocating magnetic motor. A magnetic drive member is disposed between opposed pole facing fixed magnets. A pair of magnets are alternately interposed between the fixed magnets and the linear movable drive magnets, causing the drive magnets to reciprocate. The drive magnet is attached to an output shaft causing the output shaft to move.

SUMMARY OF THE INVENTION

Apparatus is disclosed which uses rotatable magnetic members, linear movable magnetic members, and stationary magnetic members for converting rotary motion into linear motion. A rotatable member has a plurality of magnetic segments secured thereto which define a cylinder. Non-magnetic portions are provided between the rotatable magnetic segments. An elongated member supported for reciprocating linear motion is disposed in proximity to the rotatable magnetic segments. Secured to the elongated member, for unitary movement therewith, are a pair of magnets. These linearly movable magnets are spaced apart and disposed with the rotatable magnets generally positioned therebetween. Outside of these linear movable magnets are disposed a pair of fixed permanent magnets. These pair of fixed permanent magnets limit the travel of the linear movable magnets which are attached to move the elongated member. The fixed magnets also affect the speed with which the elongated member will move on the return stroke. The strength of the fixed, linearly movable, and rotatable permanent magnets determine the force output of the elongated member. Movement of the elongated reciprocating member is controlled at all times by the various permanent magnets. Operation of the disclosed apparatus is not dependent on gravitational force.

In a preferred embodiment a device for converting rotary motion to linear motion includes a rotatable shaft which extends transverse to an elongated movable member which is supported for reciprocating linear motion. A plurality of magnetic members are supported from the rotatable shaft on both sides of the elongated member. Associated with each plurality of rotatable magnetic members are a pair of permanent magnets which are secured to the elongated member on either side of the rotatable members. As the rotatable magnetic member reacts to repel one of the associated linear movable magnets, the other complimentary rotatable magnetic member reacts to attract one of its associated linear movable permanent magnets. Both rotatable magnetic members act on the linear movable magnets in the same direction to increase and balance the moving force on the linear movable member. Thus, both sets of rotatable magnetic members can move the elongated member in the same direction, thus increasing the output force. A pair of stationary magnets are provided on either side of the elongated member outside of the linear movable magnetic members, which are disposed outside of each rotatable magnetic member, to limit movement. The rotatable members can be supported by a magnetic bearing to reduce friction. Also, the elongated member can be formed with a magnetic portion which is magnetically suspended to reduce friction and provide for ease of movement. Each plurality of rotatable magnetic members defines a cylindrical shape with blank or non-magnetic portions between the magnetic segments. In one embodiment, at least two magnetic segments having a blank therebetween have the same polarity. That is, at least two adjacent magnets have the same magnetic pole, north or south, facing outward.

Electric coils can be disposed in proximity to a movable magnetic member to generate an electric current as the rotatable magnetic members move. The electric current can be used to supply a battery or other electrical device, that supplies electrical energy for turning the rotatable member. The disclosed apparatus can be driven manually or by an electric motor. When driven by an electric motor, electric current generated by the movable magnetic members on the output shaft can be supplied to the motor for regenerative operation. It is felt that the disclosed magnetic drive is particularly suitable for operating an electric generating device.

BRIEF DESCRIPTION OF THE DRAWINGS

For a better understanding of the invention reference may be had to the preferred embodiments shown in the acompanying drawings in which:

FIG. 7 is a view in FIG. 5 along the line VII—VII.

DESCRIPTION OF THE PREFERRED EMBODIMENTS

Figure 1:
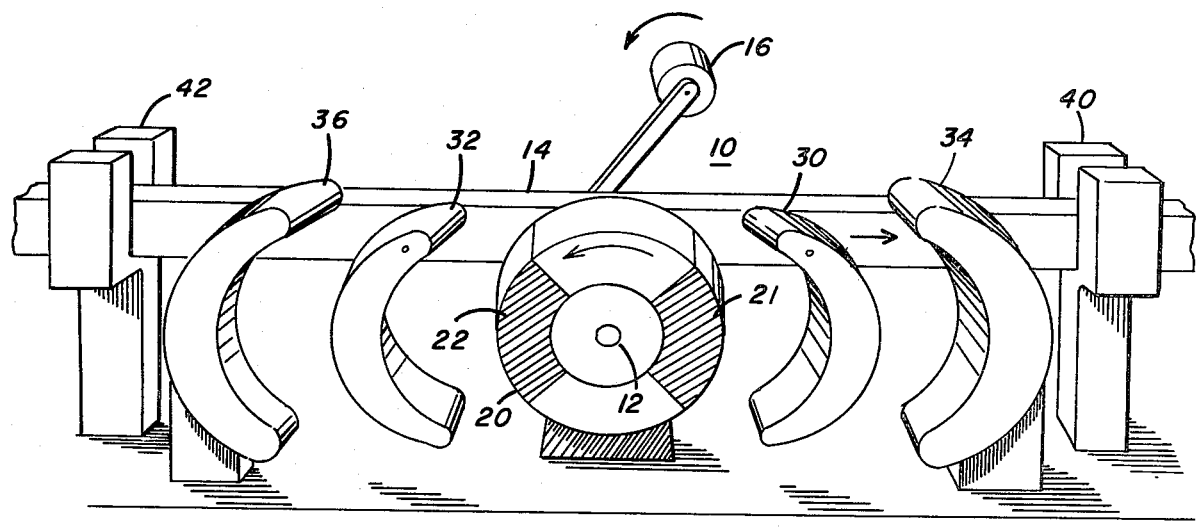
FIG. 1 is an isometric view of apparatus for converting rotary motion to linear motion constructed according to the teaching of the present invention.
Figure 2:
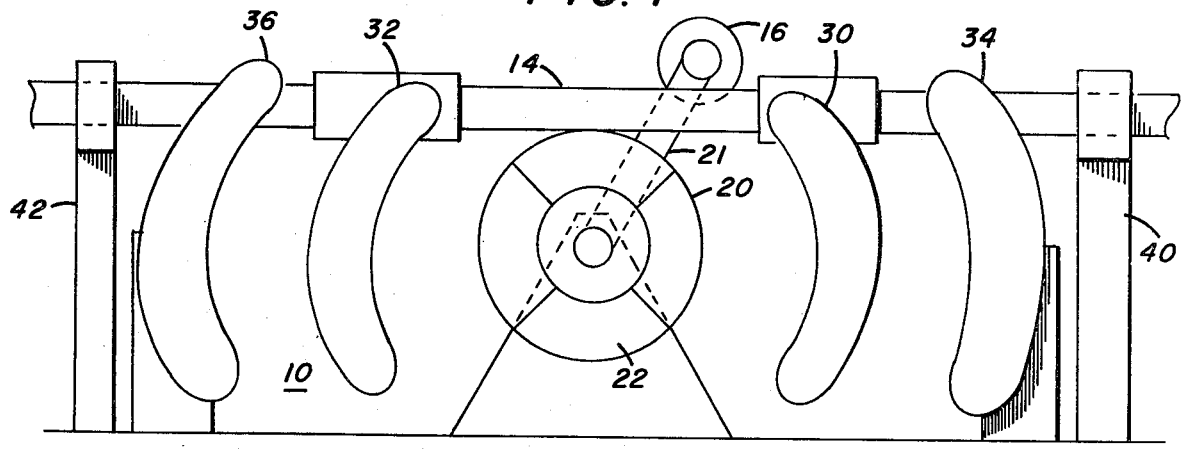
FIG. 2 is a front view of the apparatus shown in FIG. 1.
Figure 3:
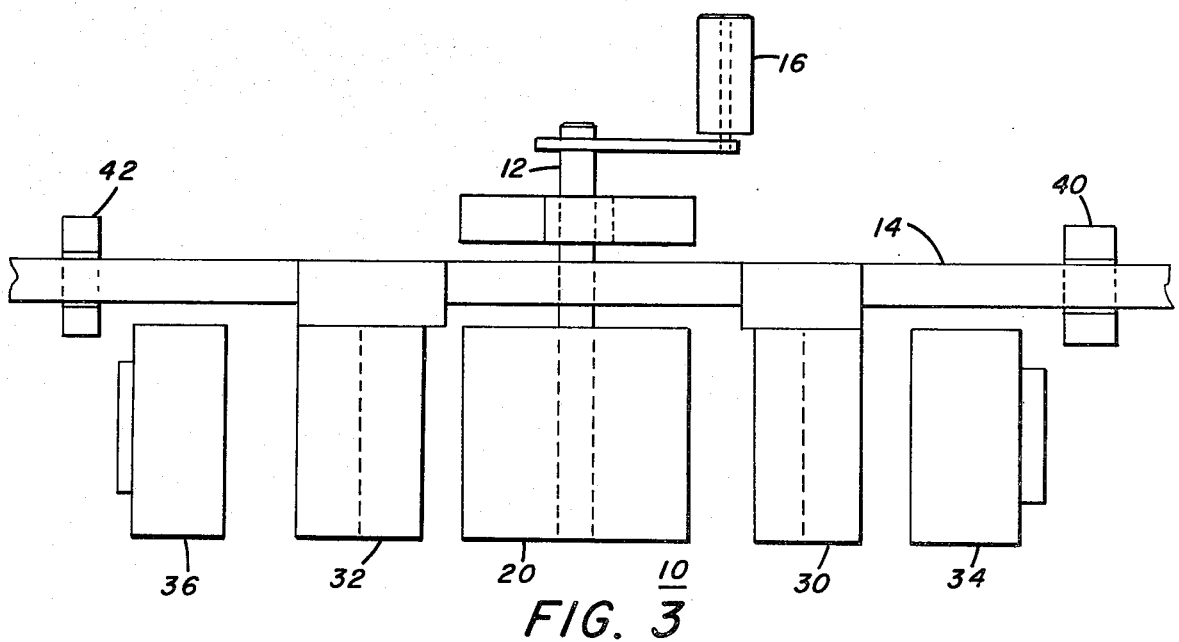
FIG. 3 is a top view of the apparatus shown in FIG. 1.

Referring now to the drawings and FIGS. 1 through 3 in particular there is shown a device 10 for converting rotary motion to linear motion constructed according to the teaching of the present invention. Machine 10 converts rotary motion to linear motion as crank 16 is rotated. As crank 16 is turned, shaft 12 is rotated and elongated member 14 is caused to move in a reciprocating linear manner. In the embodiments shown in FIGS. 2 and 3 shaft 12 is rotated by a hand crank 16, however, it is to be understood that it could also be rotated by other suitable means, such as an electric motor or various mechanical drives. A cylinder 20 is secured to shaft 12 for rotation therewith. Cylinder 20 is formed with a plurality of permanent magnets 21 and 22 formed integral therewith. In the embodiment shown in FIG. 2, cylinder 20 includes two permanent magnets. Magnet 21 has a north pole exposed face while magnet 22 has a south pole exposed face. The number of magnets provided on cylinder 20 can be varied as well as the orientation, either a north or south pole can be outward facing.

Elongated member 14 has permanent magnets 30 and 32 rigidly secured thereto. As shaft 12 is rotated, elongated member 14 is forced to move in a reciprocating linear direction. This linear movement is due to the force of the permanent magnets 21 and 22 acting on permanent magnets 30 and 32. When the cylinder 20 is in a position, as shown in FIG. 1, magnet 21 is repelling magnet 30 which is attached to linear movable member 14. At the same time, magnet 22 is attracting permanent magnet 32 which is also attached to the linear movable member. This causes member 14 to move to the right of the position as shown in FIG. 2. As member 14 moves to the right, push magnet 34 pushes on magnet 30 with a force attempting to stop the linear movable member 14 and move it to the left. As shaft 12 continues to rotate so magnets 21 and 22 are no longer aligned with magnets 30 and 32, fixed magnet 34 will stop member 14 and start moving member 14 through movable magnet 30 to the left. As shaft 12 is rotated further, magnet 22 will come into alignment with permanent magnets 30 attracting it while at the same time magnet 21 will come into alignment with magnet 32 repelling it, thus causing member 14 to move rapidly to the left. As member 14 moves to the left, fixed magnet 36 will act on movable magnet 32 to decelerate the linear movable member and to provide the initial return force for moving member 14 back in a direction towards the right. As shaft 12 is rotated, member 14 will reciprocate back and forth at a frequency determined by the speed of rotation of shaft 12. The force and speed of movement of linear member 14 is dependent upon the strength of the permanent magnets 21, 22, 30, 32, 34 and 36.

Linear movable member 14 rides in guides and bearings 40 and 42. These guides 40, 42 permit the elongated member 14 to move easily back and forth. Magnets 30 and 32 are securely fastened to elongated member 14 for unitary movement. The device shown in FIGS. 1, 2 and 3 thus converts rotary motion into linear motion as crank 16 is turned. There is no mechanical connection between rotatable shaft 12 and elongated reciprocating member 14. The force required to turn crank 16, when driving a load no greater than the maximum load which can be driven by the selected permanent magnets 21, 22, 30, 32, 34 and 36, is generally independent of the load being driven by member 14 and is dependent on the strength of permanent magnets 21, 22, 30, 32, 34 and 36. That is, for selected permanent magnets 21, 22, 30, 32, 34 and 36, the force required to turn crank 16 is not directly related to the load actually being driven.

Figure 4:
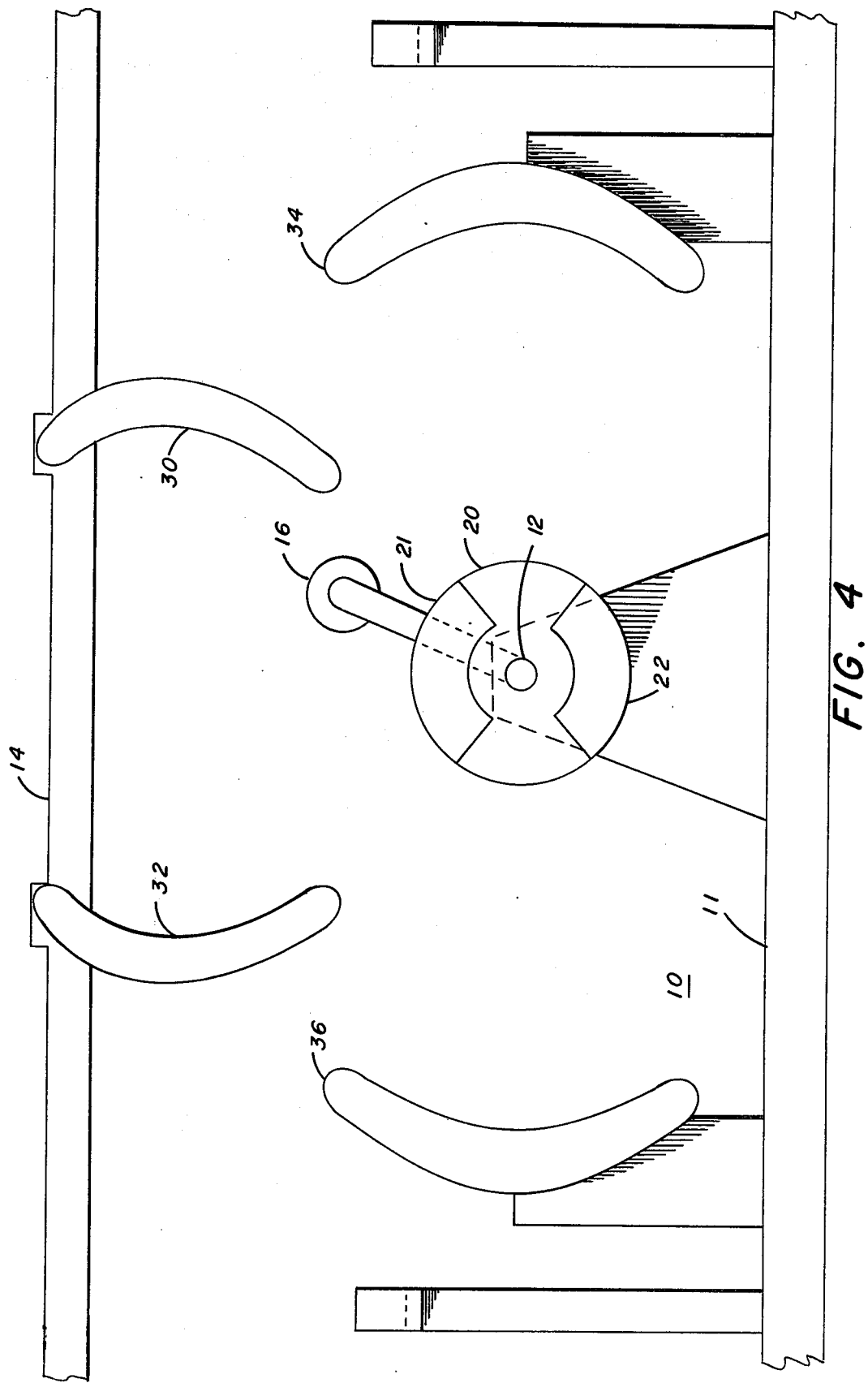
FIG. 4 is an exploded view of apparatus constructed in accordance with the teaching of the present invention.

FIG. 4 shows an exploded view of apparatus 10. This clearly shows that elongated member 14 and permanent magnets 30, 32 form a unitary member. Member 14 is supported by linear bearings 40, 42 supported from base 11. Rotary member 20 and fixed permanent magnets 34, 36 are also supported from base 11.

Figure 5:
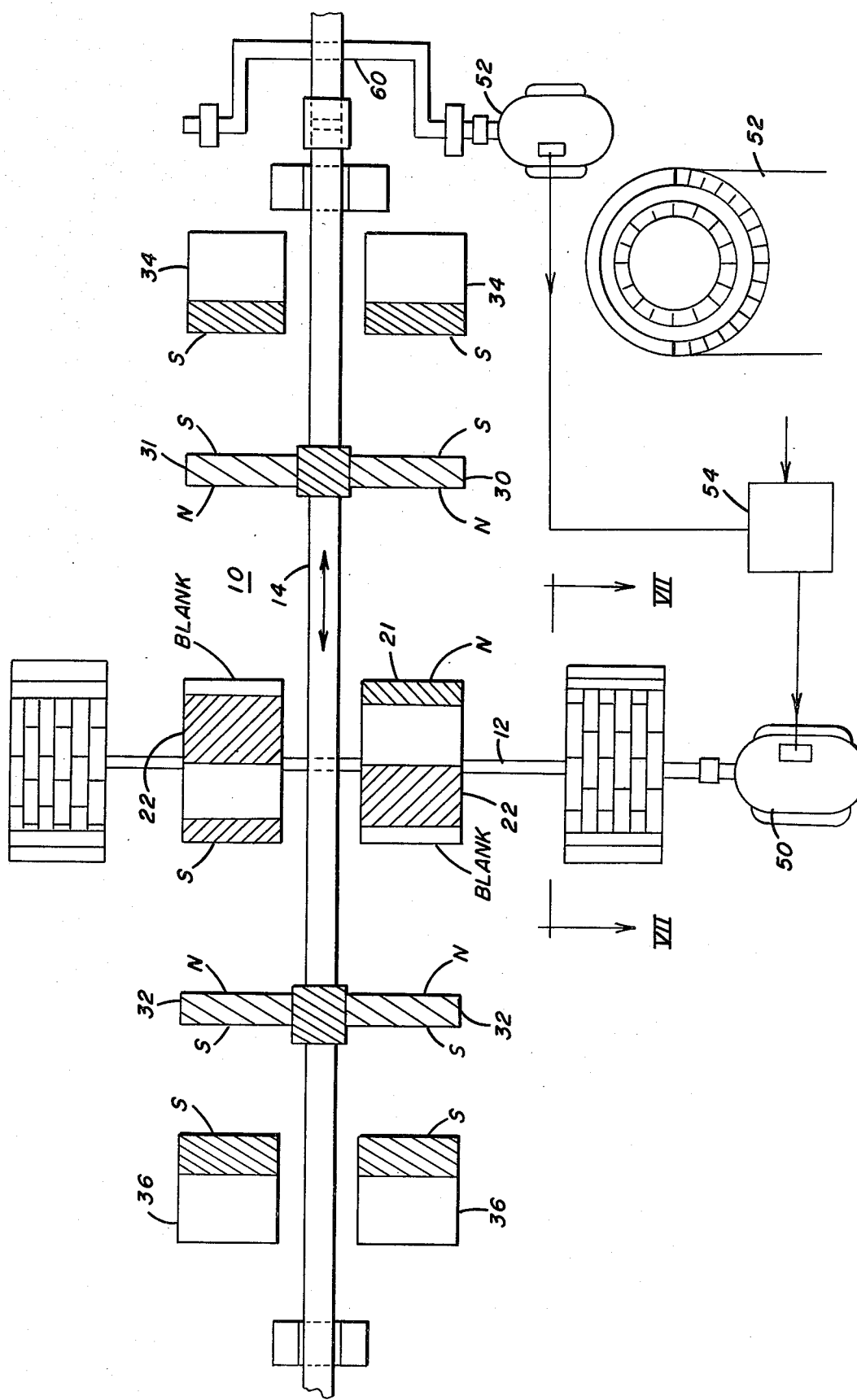
FIG. 5 is a top view of another embodiment of the invention utilizing rotatable members on both sides of the elongated reciprocating member.
Figure 6:
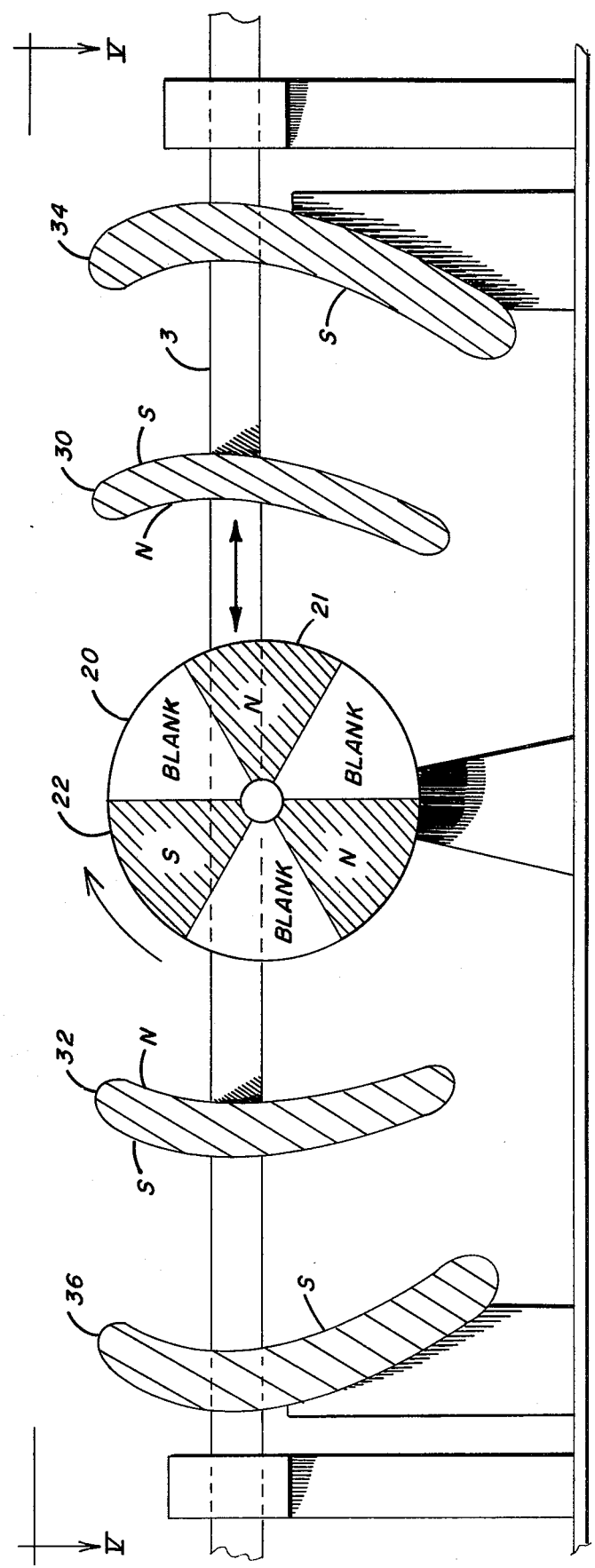
FIG. 6 is a side view of the apparatus shown in FIG. 5.

Referring now to FIGS. 5, 6 and 7 there is shown another embodiment of the invention which moving force is applied to both sides of the elongated member 14. In this embodiment a plurality of magnetic segments 21 or 22 are disposed around a cylindrical member 20. Between each magnetic segment is a blank or non-magnetic portion. In this embodiment of the invention at least two of the adjacent magnetic sections have the same polarity outwardly facing magnet member. The cylinder 20 on the other side of the reciprocating member 14 likewise has a plurality of magnetic segments wherein two adjacent magnetic members have the same polarity of outward facing poles. These cylinders with permanent magnets 21, 22 are disposed so that when one set of rotatable magnetic members 21 or 22 are pushing elongated member 14 in a given direction the other set of magnetic members 22 or 21 are pulling in the same direction. This can best be seen in FIG. 5 which shows a section view of the apparatus in FIG. 6 along the line V—V. Cylindrical members 20 having magnetic segments 21 and 22 disposed around the periphery thereof are positioned around the outside of elongated member 14. Cylindrical members 20 are constructed for movement with shaft 12. As shaft 12 is rotated, elongated member 14 is reciprocated back and forth. As can best be seen in FIG. 6, two adjacent magnetic members 21 or 22 disposed on cylinder 20 have the same polarity outward disposed pole face. This construction, provides for a proper balance of the forces acting on member 14.

An electric motor 50 can rotate shaft 12. Elongated reciprocating member 14 can be linked by a flexible or pivot connection to a crank 60. Crank 60 can drive a generator 52 which can be used for regenerative operation. The output of generator 52, through a controller 54, can supply some of the energy for continuous operation of drive motor 50. Generator 52 could also be used with a manually operated magnetic piston assembly to remove energy from the system 10.

To reduce friction, shaft 12 can be supported magnetically. As shown in FIG. 7, the magnet bearing can be formed by a semi-circular shape member formed with permanent magnets of a given polarity facing a cylindrical member formed from permanent magnets having the same outward facing polarity. The repelling magnetic force thus supports the cylindrical magnetic member 50 from semi-circular magnetic member 52 to provide a frictionless bearing.

As shown in FIG. 5, magnet 21 having a north outer pole is aligned with one of the linear movable magnets 30 on one side of elongated member 14 and at the same time. A rotatable magnet 22 having a south outer pole is aligned with linear movable member 32 on the other side of elongated member 14, to provide a combined force for movable member 14. Thus, when force is provided by the magnets of movable member 20 on one side of elongated member 14 there is a complimentary force in the same direction provided by the other cylindrical member 20 on the other side of member 14. This provides a balanced load on member 14 and provides a strong moving force. The speed with which elongated member 14 moves from a position wherein the magnets 30 or 32 are in proximity to cylindrical member 20 to a position wherein they are in proximity to fixed magnets 34 or 36 is determined by the strength of the permanent magnets utilized. Reciprocating member 14 can also have permanent magnets attached thereto and be supported magnetically for reduced friction. The frequency with which elongated member 14 reciprocates back and forth is determined by the speed with which shaft 12 rotates and the number of magnetic segments formed on cylindrical member 20. The disclosed apparatus thus converts a rotary motion of shaft 12 to a linear reciprocating motion of shaft 14. This output of shaft 14 can be used for a variety of applications. The force of movement of shaft 14 is not directly dependent on the force required to move shaft 12 but it is determined by the strength of the magnets utilized.

What is claimed is:

1. A device for converting rotary motion into linear motion comprising:
   a rotatable shaft;
   a plurality of magnet sections supported from said shaft for rotations therewith;
   an elongated member supported for reciprocating linear motion;
   a pair of spaced apart movable magnets, having like poles facing, secured to said elongated member and disposed with said plurality of magnet sections positioned therebetween; and,
   a pair of stationary magnets, having like poles facing, aligned with but positioned outside of said pair of spaced apart movable magnets.

2. A device as claimed in claim 1 comprising:
   first magnetic support means for magnetically supporting said rotatable shaft.

3. A device as claimed in claim 2 comprising:
   second magnetic support means for magnetically supporting said elongated member.

4. A device as claimed in claim 1 wherein:
   said plurality of magnetic sections are separated and disposed around a cylinder with non-magnetic portions disposed between alternate magnetic sections.

5. A device as claimed in claim 4 wherein:
   at least two adjacent magnetic sections of said plurality of magnetic members have the same polarity of magnetic pole facing outward.

6. A device as claimed in claim 1 wherein:
   said rotatable shaft extends transverse to said elongated member with said plurality of magnetic sections and said pair of spaced apart movable magnets disposed on one side of said elongated member; and comprising, a second plurality of magnetic sections supported from said shaft on the other side of said elongated member;

a second pair of spaced apart movable magnets, having like poles facing, secured to said elongated member and disposed with said second plurality of magnetic sections positioned therebetween; and, a second pair of stationary magnets, having like poles facing, aligned with but positioned outside of said second pair of spaced apart movable magnets.

7. A device as claimed in claim 6 wherein:

said plurality of magnetic sections are separated and disposed to define a cylinder with non-magnetic portions disposed between alternate magnetic sections;

at least two adjacent magnetic sections of said plurality of magnetic sections have the same polarity of pole facing outward;

said second plurality of magnetic sections are separated and disposed to define a cylinder with non-magnetic portions disposed between alternate magnetic sections; and, at least two adjacent magnetic sections of said second plurality of magnetic sections have the same polarity pole facing outward.

8. A device as claimed in claim 7 wherein:

when one of said pair of movable magnets is attracted by one of said plurality of magnetic sections then one of said second pair of movable magnetic members is being repelled by one of said second plurality of magnetic sections; and, when one of said second pair of movable members is being attracted by one of said second plurality of magnetic sections then one of said pair of movable magnets is being repelled by one of said plurality of magnetic sections.

9. Apparatus for converting rotary motion to reciprocated motion comprising:

a cylindrical rotatable member;

a plurality of magnetic segments attached to said cylindrical member for movement therewith;

an elongated slidable member supported for reciprocating linear motion;

a pair of movable permanent magnets rigidly attached to said elongated member in spaced apart relationship with like poles facing;

said cylindrical member disposed between said pair of movable permanent magnets; and, a pair of stationary magnets disposed outside of said pair of reciprocating magnets with like poles on said pair of stationary magnets facing like poles on said pair of movable permanent magnets providing a repelling force for reciprocation of said elongated slidable member as one of said pair of movable permanent magnets moves into proximity to the associated one of said pair of stationary magnets.

10. Apparatus for converting rotary motion to linear motion as claimed in claim 9 comprising:

a plurality of nonmagnetized segments, one disposed between each magnetic segment; and, at least two circumferential adjacent magnetic segments having the same pole facing outward.

* * * * *

UNITED STATES PATENT AND TRADEMARK OFFICE
CERTIFICATE OF CORRECTION

PATENT NO. : 4,207,773
DATED : June 17, 1980
INVENTOR(S) : Stahovic, Robert F.

It is certified that error appears in the above-identified patent and that said Letters Patent are hereby corrected as shown below:

Column 5, line 22, delete "which" and substitute therefor --wherein--.

Signed and Sealed this

Twenty-eighth Day of October 1980

[SEAL]

Attest:

SIDNEY A. DIAMOND

Attesting Officer

Commissioner of Patents and Trademarks